(12) United States Patent
Hartman et al.

(10) Patent No.: US 8,151,125 B1
(45) Date of Patent: Apr. 3, 2012

(54) SYSTEM AND METHOD FOR PROVIDING MULTI-POINT CALIBRATION OF AN ADAPTIVE VOLTAGE SCALING SYSTEM

(75) Inventors: Mark Hartman, Santa Clara, CA (US); James T. Doyle, Nederland, CO (US); Dragan Maksimovic, Boulder, CO (US); Pasi Salmi, Kemi (FI); Juha Pennanen, Oulu (FI); Sandeep Dhar, Boulder, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 226 days.

(21) Appl. No.: 12/462,888

(22) Filed: Aug. 11, 2009

Related U.S. Application Data

(62) Division of application No. 11/134,997, filed on May 23, 2005, now Pat. No. 7,581,120.

(51) Int. Cl.
*G06F 1/26* (2006.01)
(52) U.S. Cl. .................... 713/300; 702/85; 702/117
(58) Field of Classification Search ............ 324/750.02; 702/85, 117; 713/300
See application file for complete search history.

(56) References Cited

U.S. PATENT DOCUMENTS

| | | | |
|---|---|---|---|
| 5,867,012 A | 2/1999 | Tuthill | |
| 5,929,622 A | 7/1999 | Kardash | |
| 6,157,247 A | 12/2000 | Abdesselem et al. | |
| 6,208,127 B1 | 3/2001 | Doluca | |
| 6,535,735 B2 | 3/2003 | Underbrink et al. | |
| 6,548,991 B1 | 4/2003 | Maksimovic et al. | |
| 6,697,767 B2 | 2/2004 | Wang et al. | |
| 6,868,503 B1 | 3/2005 | Maksimovic et al. | |
| 6,870,410 B1 | 3/2005 | Doyle et al. | |
| 6,944,780 B1 | 9/2005 | Kranzen et al. | |
| 6,980,037 B1 * | 12/2005 | Page et al. ..................... | 327/143 |
| 6,985,025 B1 | 1/2006 | Maksimovic et al. | |
| 6,996,730 B2 | 2/2006 | Bonnett | |
| 7,002,325 B2 | 2/2006 | Harris et al. | |
| 7,024,568 B2 | 4/2006 | Maksimovic et al. | |
| 7,075,276 B2 | 7/2006 | Morales | |
| 7,106,040 B1 | 9/2006 | Maksimovic et al. | |
| 7,117,378 B1 | 10/2006 | Maksimovic et al. | |
| 7,122,996 B1 | 10/2006 | Huang | |
| 7,268,526 B1 | 9/2007 | Smith | |
| 7,276,925 B2 | 10/2007 | Dobberpuhl et al. | |
| 7,289,921 B1 | 10/2007 | Salmi et al. | |
| 7,301,378 B2 | 11/2007 | Cao | |
| 7,356,716 B2 * | 4/2008 | Boerstler et al. .............. | 713/300 |
| 7,479,768 B1 | 1/2009 | Salmi | |
| 7,493,149 B1 | 2/2009 | Doyle et al. | |
| 7,518,350 B2 | 4/2009 | Leung | |
| 7,581,120 B1 | 8/2009 | Hartman et al. | |

(Continued)

OTHER PUBLICATIONS

Sandeep Dhar, et al., "Switching Regulator with Dynamically Adjustable Supply Voltage for Low Power VLSI", The 27th Annual Conference of the IEEE Industrial Electronics Society, 2001, p. 1874-1879.

(Continued)

*Primary Examiner* — Albert Wang

(57) ABSTRACT

A system and method is disclosed for providing multi-point calibration of an adaptive voltage scaling (AVS) system. A plurality of Reference Calibration Codes (RCCs) within a multi-point calibration table is provided. Each code is associated with one of the clock frequencies of the adaptive voltage scaling (AVS) system. The present invention provides multi-point calibration by calibrating a Reference Calibration Code (RCC) for each operating point (clock frequency) of the adaptive voltage scaling (AVS) system.

20 Claims, 5 Drawing Sheets

U.S. PATENT DOCUMENTS

| | | |
|---|---|---|
| 7,581,131 B1 | 8/2009 | Prasad et al. |
| 7,602,166 B1 | 10/2009 | Kang |
| 7,788,508 B1 | 8/2010 | Salmi et al. |
| 7,921,312 B1 | 4/2011 | Pennanen et al. |
| 2008/0303501 A1 | 12/2008 | Prodic |
| 2011/0089914 A1 | 4/2011 | Hartman |

OTHER PUBLICATIONS

Sandeep Dhar, et al., "Closed-Loop Adaptive Voltage Scaling Controller for Standard-Cell ASICs", ISLPED '02, Aug. 12-14, 2002, 5 pages.

Mohamed Elgebaly, et al., "Variation-Aware Adaptive Voltage Scaling System", IEEE Transactions on Very Large Scale Integration (VLSI) Systems, vol. 15, No. 5, May 2007, p. 560-571.

"PowerWise AVS Energy Management Unit with SPMI", National Semiconductor Corporation, Mar. 5, 2009, 44 pages.

"Intel Pentium 4 Processor VR-Down Design Guidelines", Intel, Nov. 2002, 16 pages.

Juha Pennanen, et al., "System and Method for Providing Hardware Performance Monitors for Adaptive Voltage Scaling With a Plurality of VT Logic Libraries", U.S. Appl. No. 11/712,709 filed Mar. 1, 2007.

"6-Bit Programmable 2-/3-Phase Synchronous Buck Controller, ADP3197", Analog Devices, 2007, 32 pages.

"8-Bit Programmable 2- to 4-Phase Synchronous Buck Controller, ADP3192", Analog Devices, 2006, 32 pages.

Juha Pennanen, "Adaptive Voltage Scaling (AVS) Control System for Multiple Voltage Domains", U.S. Appl. No. 12/653,416 filed Dec. 14, 2009.

"Voltage Regulator Module (VRM) and Enterprise Voltage Regulator-Down (EVRD) 11.1", Design Guidelines, Intel, Sep. 2009, 62 pages.

Office Action dated Nov. 28, 2011 in connection with U.S. Appl. No. 12/592,881.

\* cited by examiner

SYSTEM AND METHOD FOR PROVIDING MULTI-POINT CALIBRATION OF AN ADAPTIVE VOLTAGE SCALING SYSTEM

This application is a divisional of prior U.S. patent application Ser. No. 11/134,997 filed on May 23, 2005 now U.S. Pat. No. 7,581,120.

TECHNICAL FIELD OF THE INVENTION

The present invention relates generally to low power integrated circuits and, more particularly, to low power integrated circuits that employ multiple operating clock frequencies and adaptive voltage scaling.

BACKGROUND OF THE INVENTION

Modern digital integrated circuits such as central processing units (CPUs) are typically capable of operating with several different clock frequencies. Assume that a CPU can reduce its clock frequency while still meeting the processing requirements of an application that is running on the CPU. As is well known, a reduction in the clock frequency of the CPU proportionally reduces the CPU power consumption. With a lower clock frequency less power is consumed because there are fewer signal level changes within a given time period.

As is also well known, the power consumption of a digital circuit is quadratically proportional to the operating voltage. Therefore, decreasing the voltage level of the operating voltage (i.e., the supply voltage) and reducing the clock frequency can provide significant power savings in a digital circuit.

Dynamic Voltage Scaling (DVS) is a power management technique in which pre-determined voltage values (within a voltage table) are used for each requested operating clock frequency of a CPU. The voltage levels that are defined in the voltage table must be carefully selected in order to adequately cover all process and temperature corners so that the CPU will function correctly at each clock frequency.

Adaptive Voltage Scaling (AVS) is a power management technique in which the supply voltage of a digital integrated circuit is adjusted automatically. The supply voltage is adjusted using closed loop feedback to a minimum level that is required for the proper operation of the integrated circuit at a given clock frequency.

The major difference between Dynamic Voltage Scaling (DVS) and Adaptive Voltage Scaling (AVS) is that the Adaptive Voltage Scaling (AVS) includes automatic variation of the process and temperature in order to balance the supply voltage and system delay (digital cell delay) that is due to closed loop feedback. This means that the supply voltage in the AVS system is automatically reduced at lower temperatures and for faster silicon. As the supply voltage is reduced, the power consumption is also reduced.

FIG. 1 illustrates a block diagram of an embodiment of an exemplary prior art Adaptive Voltage Scaling (AVS) system 100. AVS system 100 comprises a System-on-a-Chip (SoC) unit 110 and an Adaptive Voltage Scaling (AVS) regulator 120. The System-on-a-Chip (SoC) unit 110 comprises a Clock Management Unit (CMU) 130, a Variable Voltage Domain CPU System 140, a Hardware Performance Monitor (HPM) 150, and an Advanced Power Controller (APC) 160. The Hardware Performance Monitor (HPM) 150 is located within the Variable Voltage Domain CPU System 140.

The Clock Management Unit (CMU) 130 receives a system clock signal from a system clock unit (not shown in FIG. 1). The Clock Management Unit (CMU) 130 provides clock frequencies for the central processing unit (CPU) (also not shown in FIG. 1). The Clock Management Unit (CMU) 130 also provides clock frequencies for the Hardware Performance Monitor (HPM) 150. The clock frequencies that are provided to the Hardware Performance Monitor (HPM) 150 are represented by the designation HPM CLOCK.

The Hardware Performance Monitor (HPM) 150 tracks gate delays in the current operational conditions. The CPU system and the Hardware Performance Monitor (HPM) 150 are in the Variable Voltage Domain CPU System 140. The Hardware Performance Monitor (HPM) 150 outputs a performance code to the Advanced Power Controller (APC) 160. The performance code indicates the propagation delay of digital gate cells. The Advanced Power Controller (APC) 160 processes the delay data and requests appropriate changes to the supply voltage.

The Advanced Power Controller (APC) 160 is coupled to and communicates with the Adaptive Voltage Scaling (AVS) regulator 120. In one embodiment the coupling between the Advanced Power Controller (APC) 160 and the Adaptive Voltage Scaling (AVS) regulator 120 is a PowerWise™ interface (PWI). The mark PowerWise™ is a trademark of the National Semiconductor Corporation. The Advanced Power Controller (APC) 160 sends a request to the Adaptive Voltage Scaling (AVS) regulator 120 to change the supply voltage. The Adaptive Voltage (AVS) regulator 120 provides the requested supply voltage level to the SoC 110. The adjustable supply voltage from the Adaptive Voltage Scaling (AVS) regulator 120 is designated $V_{AVS}$ in FIG. 1.

The operating system of a modern central processing unit (CPU) may support a real time scheduling of performance levels. Each performance level may have associated with it a specific value of operating clock frequency. The operating system is capable of selecting an operating clock frequency for which the CPU performance is minimized on a real time basis and for which the deadlines of a particular application are still met. For example, while an MPEG4 movie encoding application is running, a performance scheduling algorithm of the operating system may predict and change the performance level of the CPU in ten millisecond (10 ms) interval's.

The Hardware Performance Monitor (HPM) 150 tracks gate delays in the current operational conditions. The Hardware Performance Monitor (HPM) 150 outputs a performance code to the Advanced Power Controller 160. The performance code indicates the propagation delay of digital gate cells. In particular, Hardware Performance Monitor (HPM) 150 sends the performance code to the Advanced Power Controller 160. The Advanced Power Controller 160 then subtracts the performance code from a standard Reference Calibration Code (RCC) to obtain an error signal.

The error signal is referred to as "Slack Time". The Slack Time error signal comprises a digital error signal in a two's complement number format. If the Slack Time is positive an increase in voltage is required. If the Slack Time is negative a decrease in voltage is required. The Slack Time error signal is provided to a Compensation Unit (not shown) within the Advanced Power Controller 160. Based on the value of the Slack Time error signal, the Compensation Unit sends a signal to AVS Regulator 120 to cause AVS Regulator 120 to adjust the value of the adjustable output voltage ($V_{AVS}$) of AVS Regulator 120.

In prior art "single point calibration" systems there is only one Reference Calibration Code (RCC) for all of the operating frequencies. This means that the worst case Slack Time error signal must be accounted for over all the operating frequencies. The performance of the adaptive voltage scaling (AVS) system would be improved if a separate, optimized Reference Calibration Code (RCC) were employed for each operating point (clock frequency) in the adaptive voltage scaling (AVS) system.

Therefore, there is a need in the art for a system and method that is capable of providing multi-point calibration in an adaptive voltage scaling (AVS) system.

SUMMARY OF THE INVENTION

To address the above-discussed deficiencies of the prior art, it is a primary object of the present invention to provide a system and method for efficiently providing multi-point calibration in an adaptive voltage scaling (AVS) system.

In an advantageous embodiment of the present invention the adaptive voltage scaling (AVS) system comprises a Hardware Performance Monitor (HPM) and an Advanced Power Controller (APC) in a Central Processor Unit (CPU). The Hardware Performance Monitor (HPM) correlates the logic cell delay to the supply voltage of the Central Processor Unit (CPU). The Advanced Power Controller (APC) comprises the reference, comparison, and compensation functions that are needed to achieve closed loop control of the digital processor delay margin.

The operating points in an Adaptive Voltage Scaling (AVS) system are the different clock frequencies that the CPU clock will scale to. Hardware Performance Monitor (HPM) does not track the real time delay perfectly. Therefore, over multiple operating points there will be a distribution of the Hardware Performance Monitor (HPM) measurement error. This error must be included in the calibration of the AVS reference.

In the present invention the AVS reference comprises a plurality of Reference Calibration Codes in a Multi-Point Calibration Table. The present invention achieves multi-point calibration by calibrating a Reference Calibration Code (RCC) for each operating point (clock frequency) of the AVS system. Each Reference Calibration Code (RCC) accounts for the Hardware Performance Monitor (HPM) measurement error and transient supply voltage response at each individual operating clock frequency.

A system integrator (or an external micro-controller) is used to achieve the multi-point calibration method of the present invention. The system integrator uses computer software to control the operating points (requested clock frequencies) of the AVS system. The system integrator also monitors the Central Processing Unit (CPU) for valid operation.

It is an object of the present invention to provide a system and method for efficiently providing multi-point calibration in an adaptive voltage scaling (AVS) system.

It is another object of the invention to provide a system and method for providing a separate, optimized Reference Calibration Code (RCC) for each operating point (clock frequency) in an adaptive voltage scaling (AVS) system.

It is yet another object of the invention to provide a calibration operator device for co-ordinating the steps of a multi-point calibration procedure for an adaptive voltage scaling (AVS) system.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 2 through 6, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged adaptive voltage scaling system.

Figure 1:
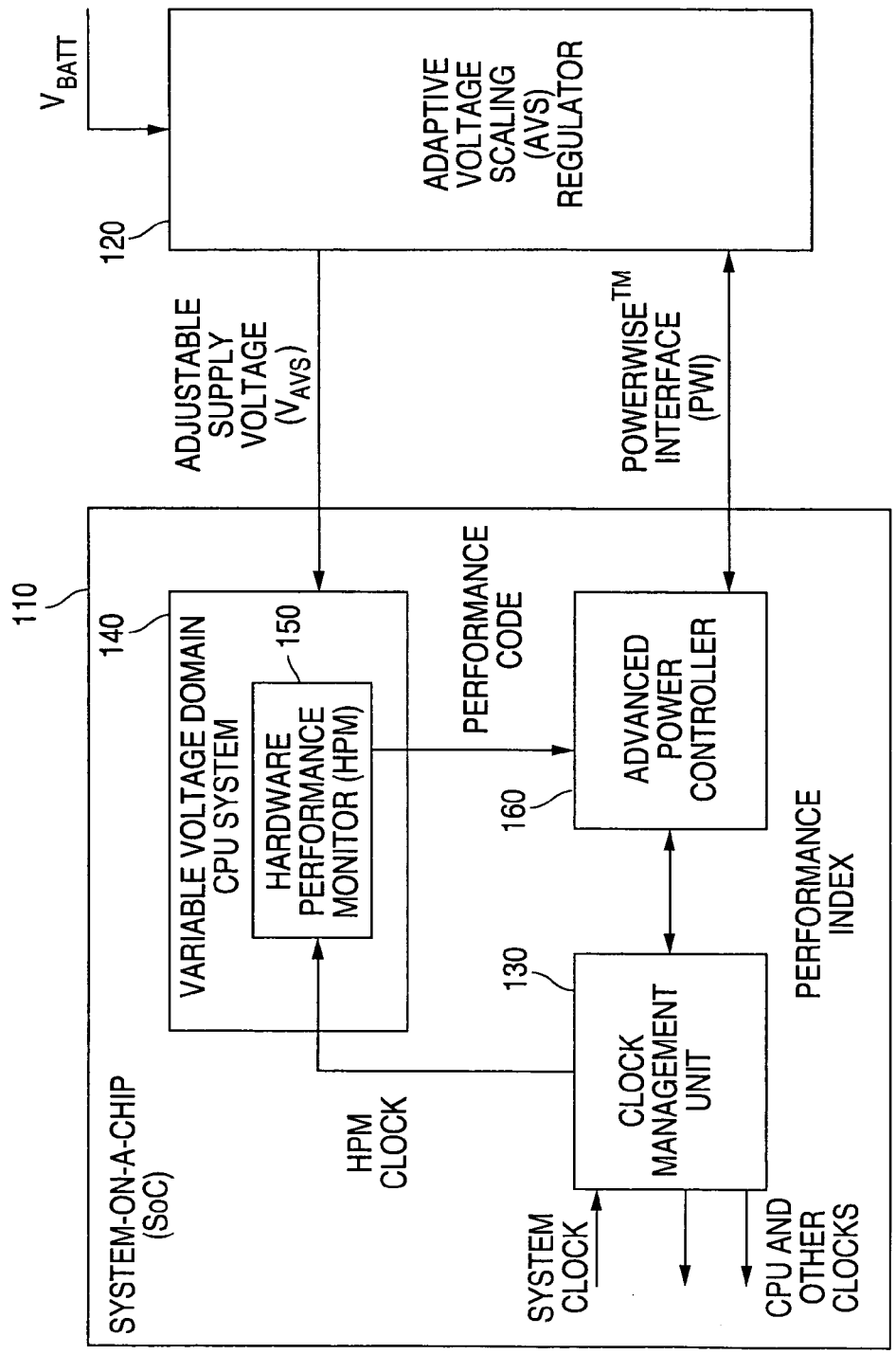
FIG. 1 is a block diagram illustrating an exemplary prior art adaptive voltage scaling (AVS) system.
Figure 2:
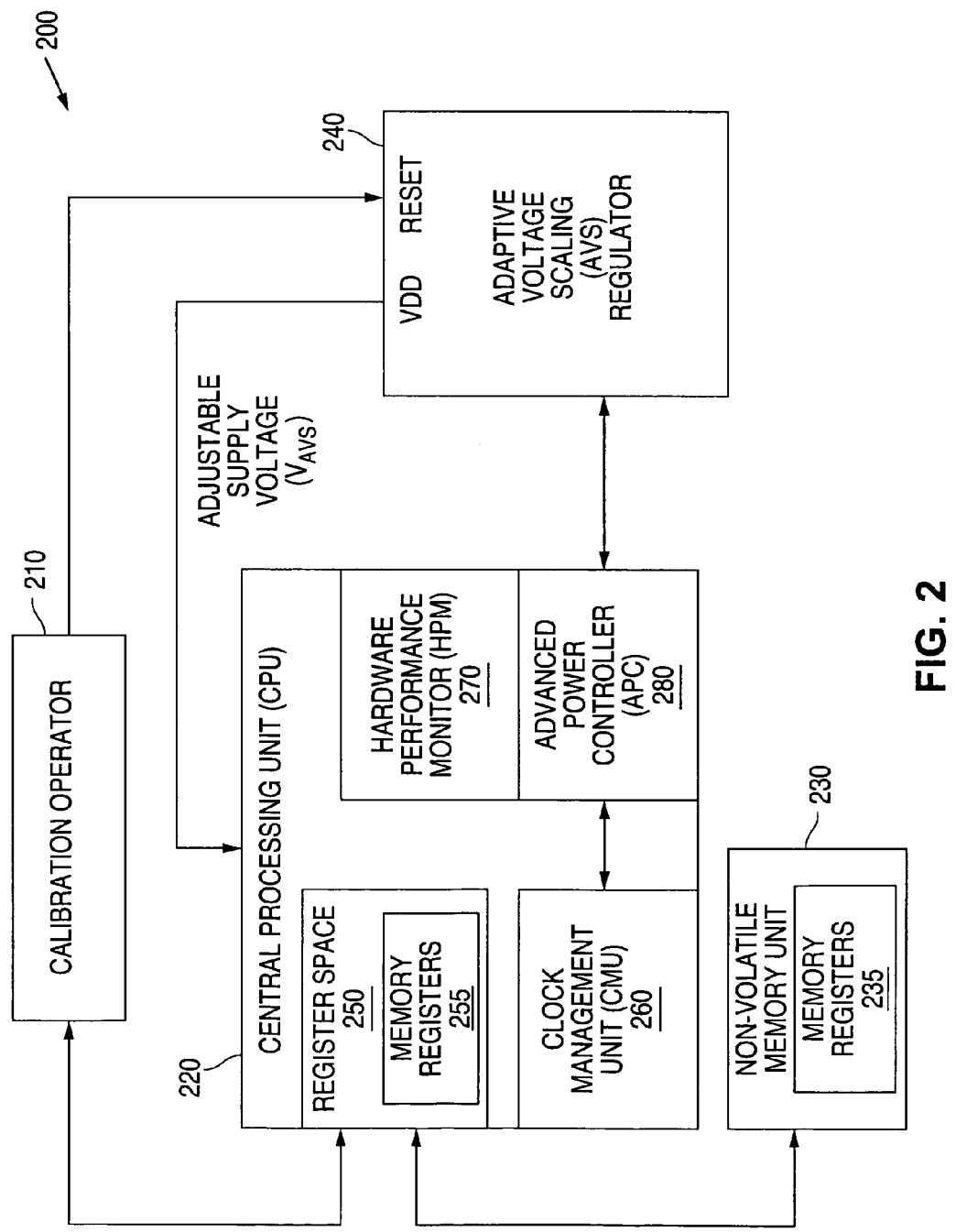
FIG. 2 is a block diagram illustrating an advantageous adaptive voltage scaling (AVS) system in accordance with the principles of the present invention.

FIG. 2 illustrates a block diagram illustrating an advantageous embodiment of an Adaptive Voltage Scaling (AVS) System 200 of the present invention. AVS System 200 comprises a Calibration Operator 210, a Central Processing Unit (CPU) 220, a Non-Volatile Memory Unit 230, and an Adaptive Voltage Scaling (AVS) Regulator 240. The various elements of AVS System 200 are coupled together as shown in FIG. 2. Central Processing Unit (CPU) 220 comprises Register Space 250, Clock Management Unit (CMU) 260, Hardware Performance Monitor (HPM) 270, and Advanced Power Controller (APC) 280. Register Space 250 comprises a plurality of Memory Registers 255. Non-Volatile Memory Unit 230 comprises a plurality of Memory Registers 235.

Clock Management Unit 260 receives a system clock signal (not shown in FIG. 2) from a system clock (also not shown in FIG. 2). Clock Management Unit 260 provides clock frequencies for the Central Processing Unit (CPU) 220. Clock Management Unit 260 also provides clock frequencies for the Hardware Performance Monitor (HPM) 270.

Clock Management Unit 260 is also coupled to Advanced Power Controller (APC) 280. Clock Management Unit 260 contains handshaking logic circuitry that is capable of requesting and acknowledging a new operating frequency from the AVS system 200. Clock Management Unit 260 is capable of providing a target performance level to Advanced Power Controller 280. Clock Management Unit 260 is also capable of receiving the current performance level from Advanced Power Controller 280. Advanced Power Controller 280 provides control signals to make state transitions during operation of AVS system 200.

When the Central Processing Unit (CPU) 220 requests a performance level change, the Clock Management Unit (CMU) 260, the Hardware Performance Monitor (HPM) 270, and the Advanced Power Controller (APC) 280 interact as follows. First, CPU 220 instructs the CMU 260 to change the CPU operating clock frequency in order to go to a new performance level. Then the CMU 260 provides a new Frequency Request signal to the APC 280. At the same time the CMU 260 provides a new "HPM Clock" signal to the HPM 270 that corresponds to the new CPU operating frequency that the CPU 220 requested from the CMU 260.

Then the Hardware Performance Monitor (HPM) 270 provides a performance code to the Advanced Power Controller (APC) 280. As will be more fully described below, APC 280 then uses a Reference Calibration Code (RCC) that corresponds with the requested CPU frequency in order to compute an error signal. The error signal is used to generate commands to the Adaptive Voltage Scaling (AVS) regulator 240. After the error is determined to be within an acceptable range, the Advanced Power Controller (APC) 280 sends a signal to the Clock Management Unit (CMU) 260 to enable the CPU clock signal at the requested frequency.

Figures 3, 4:
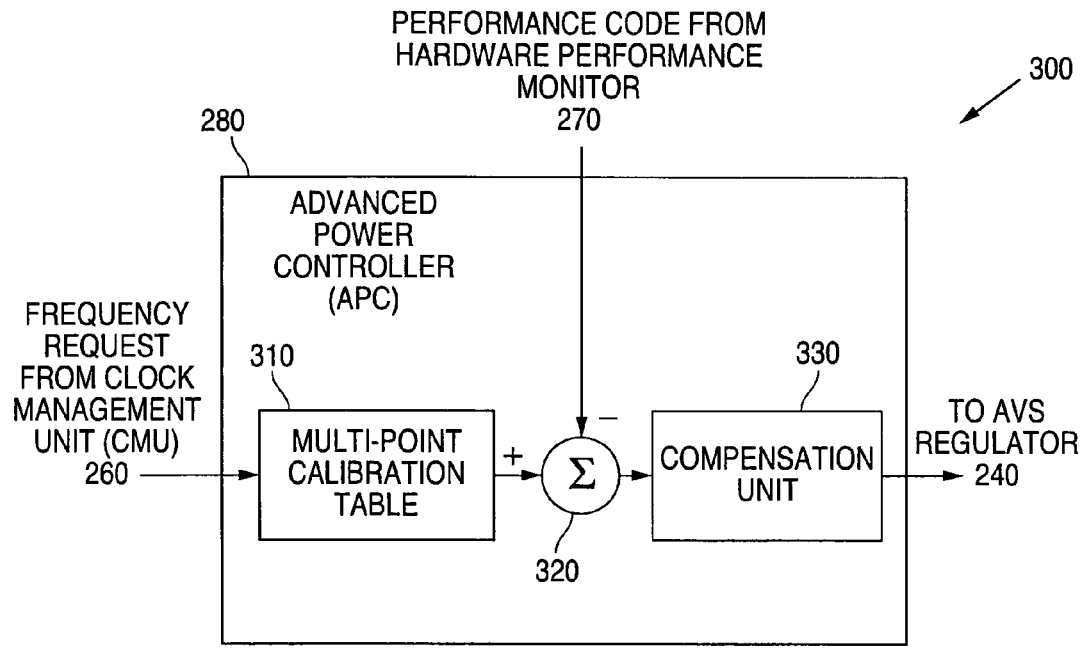
FIG. 3 is a block diagram illustrating an advantageous embodiment of an advanced power controller of an adaptive voltage scaling (AVS) system in accordance with the principles of the present invention.
FIG. 4 is diagram illustrating a multi-point calibration table in accordance with the principles of the present invention.

FIG. 3 illustrates a block diagram 300 illustrating an advantageous embodiment of Advanced Power Controller 280. Advanced Power Controller 280 comprises a Multi-Point Calibration Table 310, a summation unit 320, and a Compensation Unit 330. The Multi-Point Calibration Table 310 is shown in more detail in FIG. 4. For each value of operating frequency the Multi-Point Calibration Table 310 contains an associated value of a Reference Calibration Code (RCC).

During operation of Central Processing Unit (CPU) 220, the Clock Management Unit (CMU) 260 sends a Frequency Request signal to the Multi-Point Calibration Table 310. In response to the Frequency Request signal, the Advanced Power Controller (APC) 280 selects the particular Reference Calibration Code (RCC) that corresponds to the requested frequency. The Advanced Power Controller (APC) 280 sends the selected Reference Calibration Code (RCC) from Multi-Point Calibration Table 310 to the summation unit 320. For example, from FIG. 4 it may be seen that the Reference Calibration Code (RCC) that corresponds to Frequency F2 is designated "RCC 2".

In AVS System 200 control of the value of the Reference Calibration Code (RCC) may be made only through the Multi-Point Calibration Table 310. For this reason, the calibration process for AVS System 200 involves writing data to the Multi-Point Calibration Table 310.

The Hardware Performance Monitor (HPM) 270 tracks gate delays for the new operating frequency. The Hardware Performance Monitor (HPM) 270 outputs a performance code to the Advanced Power Controller 280. The performance code indicates the propagation delay of digital gate cells. In particular, as shown in FIG. 3, Hardware Performance Monitor (HPM) 270 sends the performance code to the summation unit 320. The summation unit 320 then subtracts the performance code from the Reference Calibration Code (RCC) from Multi-Point Calibration Table 310 to obtain an error signal.

The error signal from summation unit 320 is referred to as "Slack Time". The Slack Time error signal comprises a digital error signal in a two's complement number format. If the Slack Time is positive an increase in voltage is required. If the Slack Time is negative a decrease in voltage is required. The Slack Time error signal is provided to Compensation Unit 330. Based on the value of the Slack Time error signal, the Compensation Unit 330 sends a signal to AVS Regulator 240 to cause AVS Regulator 240 to adjust the value of the adjustable output voltage ($V_{AVS}$) at the VDD output of AVS Regulator 240.

In prior art "single point calibration" systems there is only one Reference Calibration Code (RCC) for all of the operating frequencies. This means that the worst case Slack Time error signal must be accounted for over all the operating frequencies. In contrast, the "multi point calibration" system of the present invention provides a separate, optimized Reference Calibration Code (RCC) for each operating frequency. This ultimately translates into an improved efficiency for the Central Processing Unit (CPU) 220.

As shown in FIG. 2, the AVS System 200 of the present invention comprises a Calibration Operator 210. The functions of the Calibration Operator 210 may be performed by a human user who is operating a system interface. The system interface has the ability to output calibration test results to the user and the ability to receive and act on user control instructions. The user control instructions may include such instructions as (1) writing data to the Non-Volatile Memory Unit 230, (2) writing data to the Register Space 250 in the CPU 220, and (3) applying the reset function for AVS Regulator 240. Calibration Operator 210 may also comprise a microcontroller device or other similar device that automatically co-ordinates the steps of the calibration procedure.

The Non-Volatile Memory Unit 230 must have a sufficient number of Memory Registers 235 to store the data from the Multi-Point Calibration Table 310. The Non-Volatile Memory Unit 230 must also have at least one Status Register in the Memory Registers 235 to record and hold the status information of the calibration process.

The Register Space 250 of CPU 220 must have a sufficient number of Memory Registers 255 to store the data of the Multi-Point Calibration Table 310 (and to load the data of the Multi-Point Calibration Table 310 from the Non-Volatile Memory Unit 230). The Register Space 250 must also have at least one Status Register in the Memory Registers 255 to record and hold the status information of the calibration process.

The multi-point calibration method of the present invention employs a combination of operator control, software control, and hardware control. The operator (Calibration Operator 210) oversees the entire procedure and determines when the AVS System 200 has been calibrated. Calibration software modules are loaded into the Central Processing Unit (CPU) 220 when the calibration process is to be implemented. The calibration process is a process that differs from that of the typical operating process of AVS System 200.

Lastly, the AVS System 200 comprises the hardware elements. The hardware elements include the Central Processing Unit (CPU) 220, the Non-Volatile Memory Unit 230 and the AVS Regulator 240. The hardware elements also include Register Space 250, the Clock Management Unit (CMU) 260, the Hardware Performance Monitor (HPM) 270 and the Advanced Power Controller (APC) 280 within the CPU 220. The multi-point calibration procedure of the present invention relies upon the normal operation of the hardware elements of the AVS System 200.

The multi-point calibration procedure of the present invention comprises five major steps. In the first major step, the Calibration Operator 210 (a) enables or resets the AVS Regulator 240, and (b) initializes the AVS System 200 to fixed voltage mode, and (c) sets the AVS parameter values according to the contents of the Status Register (loaded from one of the Memory Registers 235 of Non-Volatile Memory Unit 230). The AVS System 200 also loads the current operating frequency request and the contents of the Multi-Point Calibration Table 310 from the Memory Registers 235 of Non-Volatile Memory Unit 230.

In the second major step, the Calibration Operator 210 (a) enables the AVS hardware elements to a closed loop mode and (b) runs the software for the CPU stress tests. The AVS hardware elements automatically select the particular Reference Calibration Code (RCC) in Multi-Point Calibration Table 310 that corresponds to the operating frequency request.

In the third major step, the Calibration Operator 210 verifies the proper operation of the AVS System 200 by comparing the CPU stress test outputs to a known correct output.

In the fourth major step, if the CPU passes the CPU stress tests, the Calibration Operator 210 (a) decrements (i.e., decreases by one) the current Reference Calibration Code (RCC) for the current operating frequency, and (b) saves the newly decremented Reference Calibration Code (RCC) to the copy of the Multi-Point Calibration Table 310 that is stored in the Memory Registers 235 of Non-Volatile Memory Unit 230, and (c) saves the newly decremented Reference Calibration Code (RCC) to the copy of the Multi-Point Calibration Table 310 that is stored in the Memory Registers 255 of Register Space 250 in CPU 220. Then the process is repeated from the second major step.

In the fifth major step, if the CPU fails the CPU stress tests, the Calibration Operator 210 (a) increments (i.e., increases by one) the current Reference Calibration Code (RCC) for the current operating frequency (for which the CPU previously passed the CPU stress tests), and (b) saves the newly incremented Reference Calibration Code (RCC) to the copy of the Multi-Point Calibration Table 310 that is stored in the Memory Registers 235 of Non-Volatile Memory Unit 230, and (c) saves the newly incremented Reference Calibration Code (RCC) to the copy of the Multi-Point Calibration Table 310 that is stored in the Memory Registers 255 of Register Space 250 in CPU 220. If an extra margin is desired, the Calibration Operator 210 may increase the Reference Calibration Code (RCC) by more than one. Then the Calibration Operator 210 updates the Status Register to indicate that the current frequency has been calibrated. Then the process is repeated from the first major step.

An example of the five major steps described above is set forth in the flow charts in FIG. 5 and FIG. 6. For this example it is assumed that the hardware elements of AVS System 200 are located within a System-on-a-Chip (Soc) microprocessor.

Figure 5:
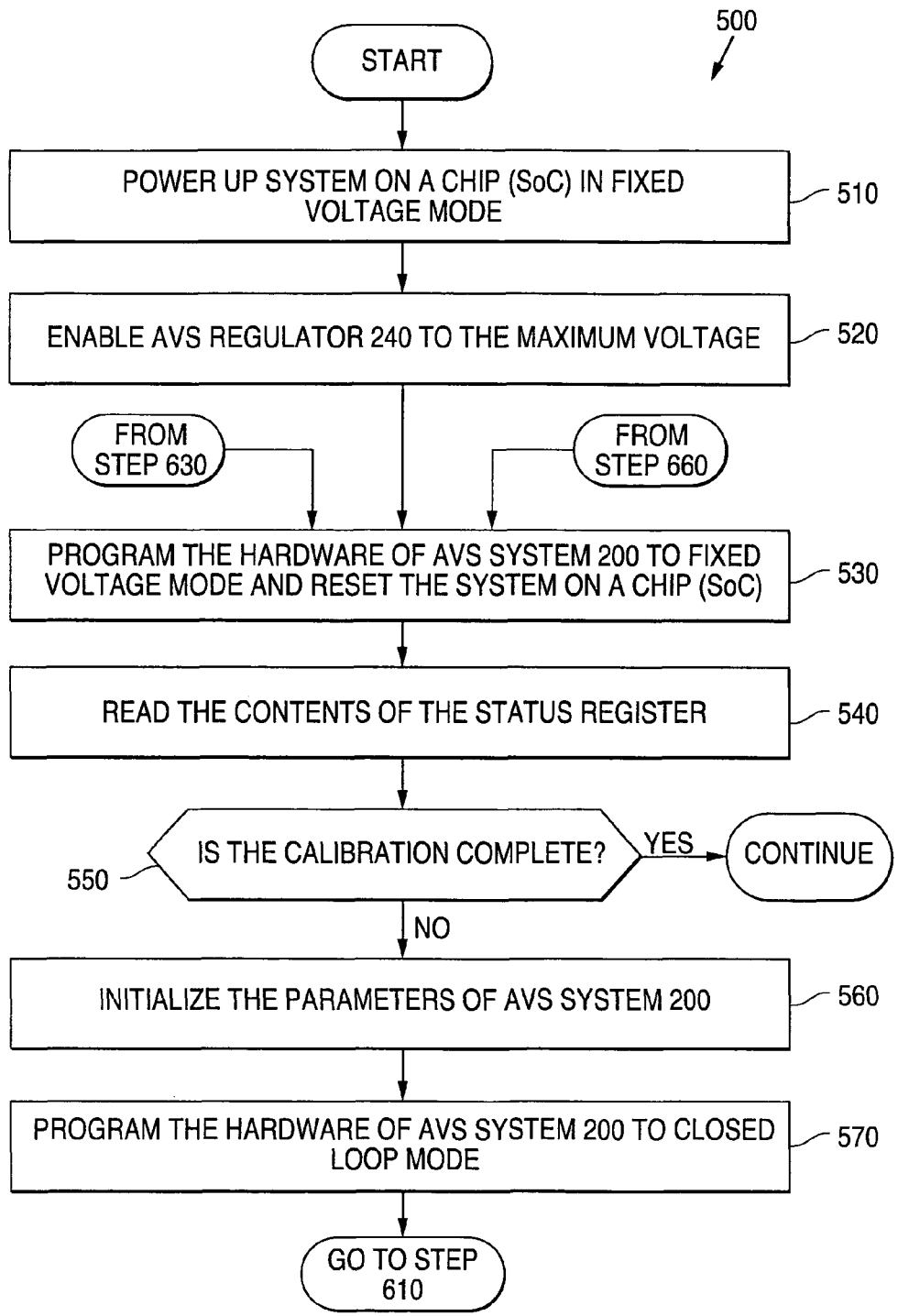
FIG. 5 is a first flow chart illustrating a first portion of an advantageous embodiment of a method of the invention.

FIG. 5 is a first flow chart 500 illustrating a first portion of an advantageous embodiment of a method of the present invention. In the first step the System-on-a-Chip (Soc) is powered up in a fixed voltage mode (step 510). Then the AVS Regulator 240 is enabled to the maximum voltage (step 520). Then the AVS system hardware is programmed to a fixed voltage mode and the System-on-a-Chip (Soc) is reset (step 530). Then the contents of the Status Register are read (step 540).

A determination is then made whether the calibration process is complete (decision step 550). If the calibration process is complete, then the calibration method of the invention terminates and other method steps continue. If the calibration process is not complete, then the AVS system parameters are initialized (step 560). The AVS system hardware is then programmed to closed loop mode (step 570). Control then passes to step 610 of FIG. 6.

Figure 6:
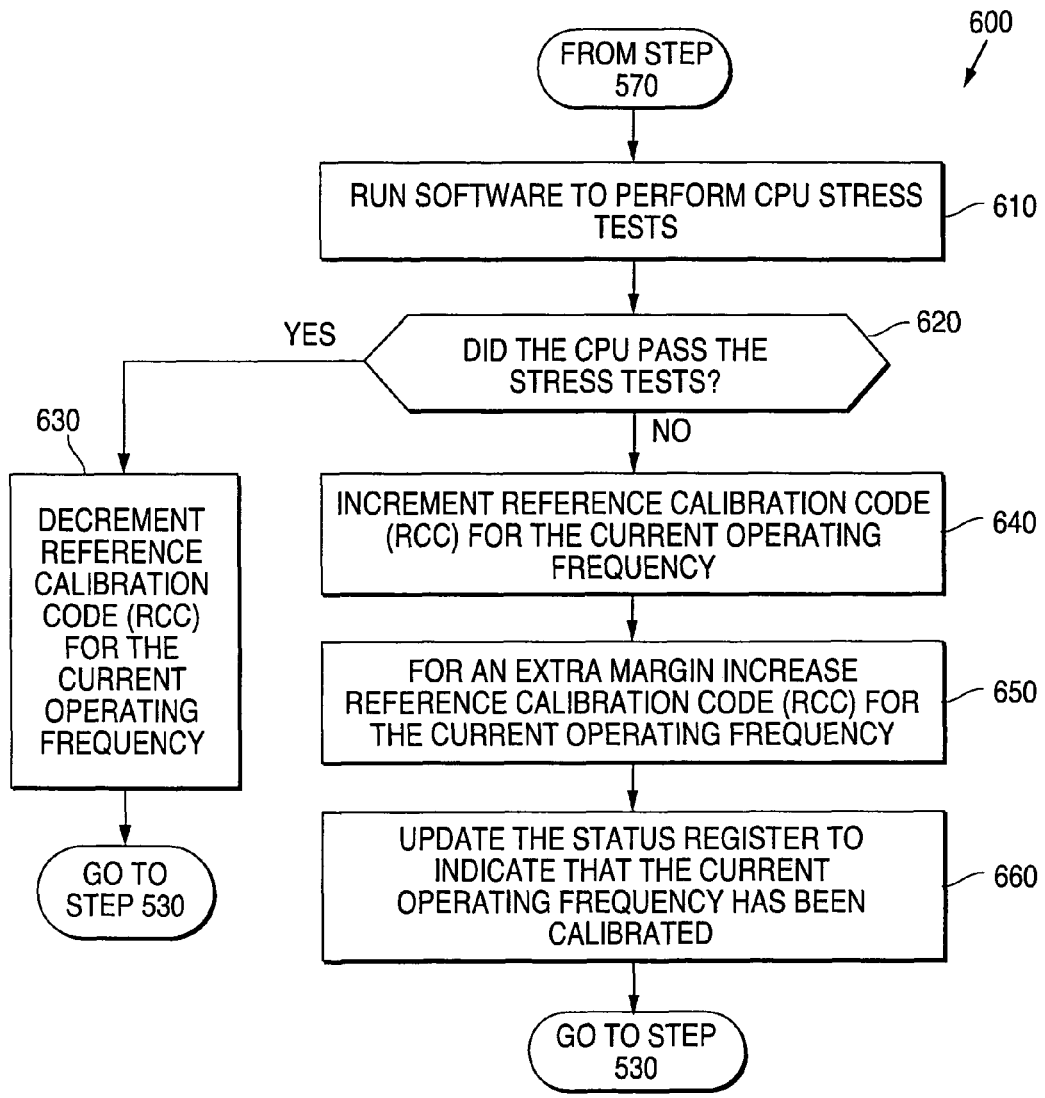
FIG. 6 is a second flow chart illustrating a second portion of an advantageous embodiment of a method of the invention.

FIG. 6 is a second flow chart 600 illustrating a second portion of an advantageous embodiment of a method of the present invention. Control passes to step 610 from step 570 of FIG. 5. Then the software to perform the CPU stress tests is executed (step 610). After the CPU stress tests have been performed, a determination is then made whether the CPU passed the stress tests (decision step 620).

If the CPU did pass the stress tests, then the Reference Calibration Code (RCC) is decremented for the current operation frequency (step 630). Control then passes to step 530 of FIG. 5 and the method steps continue.

If the CPU did not pass the stress tests, then the Reference Calibration Code (RCC) is incremented for the current operation frequency (step 640). If an extra margin is desired the Reference Calibration Code (RCC) is increased again for the current operation frequency (step 650). Then the Status Register is updated to indicate that the current operation frequency has been calibrated (step 660). Control then passes to step 530 and the method steps continue.

Although the present invention has been described with several embodiments, various changes and modifications may be suggested to one skilled in the art. It is intended that the present invention encompass such changes and modifications as fall within the scope of the appended claims.

What is claimed is:

1. A method for providing multi-point calibration of an adaptive voltage scaling system that comprises a system-on-a-chip (SoC), an adaptive voltage scaling regulator, and a calibration status register, the method comprising the steps of:
   powering up the SoC in a fixed voltage mode;
   enabling the adaptive voltage scaling regulator to a maximum voltage associated with the fixed voltage mode;
   programming the adaptive voltage scaling system to the fixed voltage mode;
   resetting the SoC; and
   reading a status value from the calibration status register.

2. The method as set forth in claim 1, further comprising the steps of:
   determining whether a calibration process is complete;
   in response to a determination that the calibration process is not complete, initializing parameters of the adaptive voltage scaling system;
   programming the adaptive voltage scaling system to a closed loop mode; and
   performing stress tests on a central processing unit.

3. The method as set forth in claim 2, further comprising the steps of:

determining whether the central processing unit passed the stress tests;

in response to a determination that the central processing unit passed the stress tests, decrementing a reference calibration code for a current operating frequency; and repeating the steps of programming the adaptive voltage scaling system, resetting the SoC, and reading the status value from the calibration status register.

4. The method as set forth in claim 3, wherein each reference calibration code is associated with a different operating frequency of the central processing unit.

5. The method as set forth in claim 3, wherein each reference calibration code is stored in a calibration table.

6. The method as set forth in claim 2, further comprising the steps of:

determining whether the central processing unit passed the stress tests;

in response to a determination that the central processing unit did not pass the stress tests, incrementing a reference calibration code for a current operating frequency;

updating the calibration status register to indicate that the current operating frequency has been calibrated; and repeating the steps of programming the adaptive voltage scaling system, resetting the SoC, and reading the status value from the calibration status register.

7. The method as set forth in claim 6, further comprising the step of:

increasing the reference calibration code for the current operating frequency to provide an extra margin of value for the reference calibration code.

8. An apparatus for providing multi-point calibration of an adaptive voltage scaling system that comprises a system-on-a-chip (SoC), an adaptive voltage scaling regulator, and a calibration status register, the apparatus configured to:

power up the SoC in a fixed voltage mode;

enable the adaptive voltage scaling regulator to a maximum voltage associated with the fixed voltage mode;

program the adaptive voltage scaling system to the fixed voltage mode;

reset the SoC; and read a status value from the calibration status register.

9. The apparatus as set forth in claim 8, wherein the apparatus is further configured to:

determine whether a calibration process is complete;

in response to a determination that the calibration process is not complete, initialize parameters of the adaptive voltage scaling system;

program the adaptive voltage scaling system to a closed loop mode; and perform stress tests on a central processing unit.

10. The apparatus as set forth in claim 9, wherein the apparatus is further configured to:

determine whether the central processing unit passed the stress tests; and in response to a determination that the central processing unit passed the stress tests, decrement a reference calibration code for a current operating frequency.

11. The apparatus as set forth in claim 10, wherein each reference calibration code is associated with a different operating frequency of the central processing unit.

12. The apparatus as set forth in claim 10, wherein each reference calibration code is stored in a calibration table.

13. The apparatus as set forth in claim 9, wherein the apparatus is further configured to:

determine whether the central processing unit passed the stress tests;

in response to a determination that the central processing unit did not pass the stress tests, increment a reference calibration code for a current operating frequency; and update the calibration status register to indicate that the current operating frequency has been calibrated.

14. The apparatus as set forth in claim 13, wherein the apparatus is further configured to:

increase the reference calibration code for the current operating frequency to provide an extra margin of value for the reference calibration code.

15. A method for providing multi-point calibration of an adaptive voltage scaling system, the method comprising the steps of:

enabling an adaptive voltage scaling regulator to a maximum voltage associated with a fixed voltage mode;

programming the adaptive voltage scaling system to the fixed voltage mode;

reading a status value from a calibration status register;

determining whether a calibration process is complete;

in response to a determination that the calibration process is not complete, initializing parameters of the adaptive voltage scaling system;

programming the adaptive voltage scaling system to a closed loop mode; and performing stress tests on a component operating using an adjustable supply voltage provided by the adaptive voltage scaling system.

16. The method as set forth in claim 15, further comprising the steps of:

determining whether the component passed the stress tests;

in response to a determination that the component passed the stress tests, decrementing a reference calibration code for the current operating frequency; and repeating the steps of programming the adaptive voltage scaling system and reading the status value from the calibration status register.

17. The method as set forth in claim 16, wherein each reference calibration code is associated with a different operating frequency of the component.

18. The method as set forth in claim 15, further comprising the steps of:

determining whether the component passed the stress tests;

in response to a determination that the component did not pass the stress tests, incrementing a reference calibration code for the current operating frequency;

updating the calibration status register to indicate that the current operating frequency has been calibrated; and repeating the steps of programming the adaptive voltage scaling system and reading the status value from the calibration status register.

19. The method as set forth in claim 18, further comprising the step of:

increasing the reference calibration code for the current operating frequency to provide an extra margin of value for the reference calibration code.

20. The method as set forth in claim 15, wherein the component comprises a processor.

* * * * *